United States Patent
Boos et al.

(10) Patent No.: US 8,668,892 B2
(45) Date of Patent: Mar. 11, 2014

(54) METHOD AND SYSTEM FOR $NO_x$ REMOVAL FROM A FLUE GAS

(71) Applicant: ALSTOM Technology Ltd., Baden (CH)

(72) Inventors: Erik W. Boos, Vederslov (SE); Lars Nilsson, Rottne (SE)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 13/799,722

(22) Filed: Mar. 13, 2013

(65) Prior Publication Data

US 2013/0259787 A1    Oct. 3, 2013

Related U.S. Application Data

(60) Provisional application No. 61/618,080, filed on Mar. 30, 2012.

(51) Int. Cl.
*B01D 53/56* (2006.01)
*B01D 53/78* (2006.01)

(52) U.S. Cl.
USPC ........... 423/235; 422/168; 422/169; 422/170; 422/187

(58) Field of Classification Search
USPC .................. 423/235; 422/168, 169, 170, 187
See application file for complete search history.

(56) References Cited

U.S. PATENT DOCUMENTS

| 3,984,522 A | 10/1976 | Saito et al. |
| 4,029,739 A | 6/1977 | Senjo et al. |
| 7,416,716 B2 | 8/2008 | Allam et al. |
| 7,708,804 B2 | 5/2010 | Darde et al. |
| 2003/0026744 A1 | 2/2003 | Hakka et al. |
| 2006/0021506 A1 | 2/2006 | Hakka et al. |
| 2007/0122328 A1* | 5/2007 | Allam et al. ........... 423/235 |

FOREIGN PATENT DOCUMENTS

| DE | 10 2008 062 495 | 6/2010 |
| DE | 10 2008 062 496 | 6/2010 |
| EP | 2 156 878 | 2/2010 |
| WO | 2011/140054 | 11/2011 |

OTHER PUBLICATIONS

International Search Report and Written Opinion for PCT/IB2013/052389 dated Jul. 3, 2013.

* cited by examiner

*Primary Examiner* — Timothy Vanoy
(74) *Attorney, Agent, or Firm* — Buchanan Ingersoll & Rooney PC

(57) ABSTRACT

A system for reducing $NO_x$ in a flue gas stream, including an absorption element, a first inlet in fluid communication with the chamber configured to deliver a pressurized flue gas to the chamber, and a second inlet in fluid communication with the chamber configured to deliver an absorbing additive to the chamber. An outlet is in fluid communication with the chamber to exhaust from the chamber flue gas that has contacted the absorbing additive. A method for reducing $NO_x$ in a flue gas including the steps of: providing a flue gas in a chamber of an absorption element, providing an absorbing additive so that it contacts at least a portion of the flue gas, and exhausting at least a portion of the flue gas from the chamber.

13 Claims, 2 Drawing Sheets

METHOD AND SYSTEM FOR $NO_x$ REMOVAL FROM A FLUE GAS

CROSS REFERENCE TO RELATED APPLICATIONS

This application claims the benefit of U.S. Provisional Patent Application No. 61/618,080 titled "Method and apparatus for $NO_x$ removal from $CO_2$ rich flue stream" filed on Mar. 30, 2012, the contents of which are incorporated herein by reference in their entirety.

FIELD OF THE DISCLOSURE

The present disclosure relates to the reduction of nitrogen oxides ("$NO_x$") in carbon dioxide ("$CO_2$") rich flue gas. More specifically, the present disclosure relates to a method and system for reducing $NO_x$ in a flue gas generated during oxy-firing combustion.

BACKGROUND OF THE DISCLOSURE

Combustion of carbon containing fuels, for example fossil fuels, can produce gaseous emissions of $CO_2$ and other pollutants, for example nitrogen oxides (individually "NO", "$NO_2$", and other nitrogen oxides; collectively "$NO_x$"). $CO_2$ has been identified as a "greenhouse" gas which may contribute to global warming. Technologies have been developed to inhibit large quantities of $CO_2$ from being released into the atmosphere during the combustion of fossil fuels. Such technologies may be employed, for example, in coal fired power plants to reduce $CO_2$ in flue gases generated during combustion. The technologies generally fall into one of three areas: post combustion capture, where $CO_2$ is removed after combustion; pre-combustion capture, where the $CO_2$ is removed before combustion, and oxy-firing combustion, where the fuel is burned in pure oxygen or oxygen enriched gas instead of atmospheric air.

Oxy-firing combustion provides a concentrated stream of $CO_2$, compared to air-firing combustion, which facilitates capture and storage of $CO_2$. By completing combustion in pure oxygen or oxygen enriched gas, the resultant flue gas leaving the combustion chamber generally has less non-reactive constituents, such as nitrogen, compared to a flue gas leaving an air-firing combustion chamber.

Prior to removing $CO_2$ from a flue gas stream of an oxy-firing combustion system, the flue gas stream may be subjected to one or more techniques to remove contaminants, for example $NO_x$, produced during combustion. For example, certain control systems may reduce $NO_x$ or inhibit its formation during combustion by adjusting certain variables in the combustion process, including but not limited to, the combustion temperature, the flow rate of fuel into the combustion chamber, and/or the flow rate of combustion gas(es) into the combustion chamber. A disadvantage of such control systems is that they can affect the efficiency of the combustion process. An alternative approach is to limit $NO_x$ emissions by re-circulating the flue gases generated during combustion into the combustion chamber.

Accordingly, there is need for an improved method and system for removing $NO_x$ from a flue gas of an oxy-firing combustion system.

SUMMARY OF THE DISCLOSURE

According to aspects illustrated herein, there is provided a system for reducing $NO_x$ in a flue gas stream. The system includes an absorption element that defines a chamber. A first inlet is in fluid communication with the chamber and is configured to deliver a pressurized flue gas to the chamber. A second inlet is in fluid communication with the chamber and is configured to deliver an absorbing additive to the chamber. An outlet is in fluid communication with the chamber. The outlet is configured to exhaust from the chamber flue gas that has contacted the absorbing additive. It should be understood that although the description refers to, for example, a first inlet, the disclosure is not limited as, for example, the first chamber may have more than one first inlet that delivers flue gases thereto. Although this clarification is provided with reference to the first inlet, it should be understood that all similar limitations are similarly not limited, unless it is explicitly stated herein.

In one embodiment, the absorption element comprises a gas/liquid scrubber. In yet another embodiment, the first inlet receives the flue gas from a unit of a gas processing unit. In yet a further embodiment, a pressure of the flue gas delivered to the chamber is between 2 bar and 50 bar. In yet a further embodiment, the pressure is between 10 bar and 20 bar.

In one embodiment, the system includes a third inlet in fluid communication with the chamber. The third inlet is configured to deliver a pH adjustment agent to the chamber. In one embodiment, the absorbing additive comprises at least one of $NaSO_2$, $Na_2S_2O_3$, and $C_6H_{12}N_2$. In yet a further embodiment, the absorbing additive comprises $NaSO_2$, $Na_2S_2O_3$, and $C_6H_{12}N_2$. In yet a further embodiment, the pH agent comprises, a basic agent, e.g., NaOH. In yet a further embodiment, the absorbing additive, the pH adjustment agent, and the flue gas react in the chamber to remove $NO_2$ from the flue gas.

According to other aspects illustrated herein, there is provided a method for reducing $NO_x$ in a flue gas. The method includes the step of providing a flue gas in a chamber of an absorption element. An absorbing additive is provided in the chamber so that the absorbing additive contacts at least a portion of the flue gas.

In one embodiment, the absorption element is a gas/liquid scrubber. In yet a further embodiment, the flue gas is provided from a unit of a gas processing unit. In yet a further embodiment, the provided flue gas is between 2 bar and 50 bar. In yet a further embodiment, the pressure is between 10 bar and 20 bar.

In yet a further embodiment, the method includes the step of providing a pH adjustment agent in the chamber. In one embodiment, the absorbing additive comprises at least one of $NaSO_2$, $Na_2S_2O_3$, and $C_6H_{12}N_2$. In yet a further embodiment, the absorbing additive comprises $NaSO_2$, $Na_2S_2O_3$, and $C_6H_{12}N_2$. In one embodiment, the pH agent is, e.g., NaOH. In yet a further embodiment, the absorbing additive, the pH adjustment agent, and the flue gas react in the chamber to remove $NO_2$ from the flue gas. According to further aspects illustrated herein, there is provided a system for reducing $NO_x$ in a flue gas. The system comprises a compressor configured to receive and pressurize a $CO_2$ gas; an absorption element comprising an absorbing additive, the absorption element fluidly coupled to the compressor. The absorption element is configured to receive pressurized $CO_2$ gas which exits the compressor and absorb $NO_2$ from the pressurized $CO_2$ gas to produce a $NO_2$ reduced gas. The system further comprises a gas purification unit in fluid communication with the absorption element and configured to receive the $NO_2$ reduced gas. In an embodiment, the system further comprises a second compressor and a second absorption element, wherein the second compressor is in fluid communication with the absorption element and the second absorption element, and the second absorption element is in further fluid communication with the gas purification unit.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION OF THE DISCLOSURE

An absorption technique may be applied to remove $NO_x$ from flue gas. In such a technique, aqueous sodium sulphite ("$Na_2SO_3$") may be used to oxidize $NO_2$ to products that may be discarded. $Na_2SO_3$ reacts with $NO_2$ to form nitric acid and sulphate ions according to the following reaction:

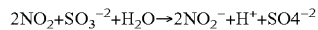

Sodium hydroxide ("NaOH") may then be added to neutralize the solution and form sodium nitrite ("$NaNO_2$").

A disadvantage of such absorption techniques is that the low solubility of NO, as compared to the solubility of $NO_2$, inhibits the removal of NO from the flue gas stream. To overcome this disadvantage, NO may be re-oxidized to $NO_2$ by the following reaction:

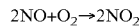

A method and system are therefore provided for $NO_x$ reduction in a $CO_2$ rich flue gas stream of an oxy-firing combustion system. The method uses pressure increases in the $CO_2$ rich flue gas caused by a gas processing unit or GPU, which is designed to compress and purify $CO_2$ rich flue gas. A $CO_2$ rich flue gas that is pressurized by compression elements of a gas processing unit, has a decreased concentration of NO and an increased concentration of $NO_2$ such that the $NO_x$ may be readily removed from the $CO_2$ rich flue gas stream by absorbing $NO_2$. The pressurized $CO_2$ rich flue gas is directed to a chamber of an absorption element (absorber), which may be a gas/liquid scrubber. The term chamber, as used herein, refers to an area in which a $CO_2$ rich flue gas is contacted with one or more additional elements to remove $NO_x$ from the flue gas.

An absorbing additive, such as sodium sulfite ("$NaSO_2$"), sodium thiosulfate ("$Na_2S_2O_3$"), triethylenediamine ("$C_6H_{12}N_2$"), other suitable additive capable of absorbing $NO_2$, or any combination thereof, is injected into the absorption element. The absorption element may further be injected with a pH adjustment agent. After at least a portion of the $NO_2$ is removed from the $CO_2$ rich flue gas, the $CO_2$ rich flue gas may be returned to the gas processing unit for further processing or for drying, depending where the absorption element is implemented. By employing the compression sections of a gas processing unit to decrease the concentration of NO and increase the concentration of $NO_2$, $NO_x$ is more readily available for absorption as $NO_2$. Addition of an $NO_2$ absorbing additive to a pressurized $CO_2$ rich flue gas provides an efficient and effective method of removing $NO_x$ from the $CO_2$ rich flue gas.

Figure 1:
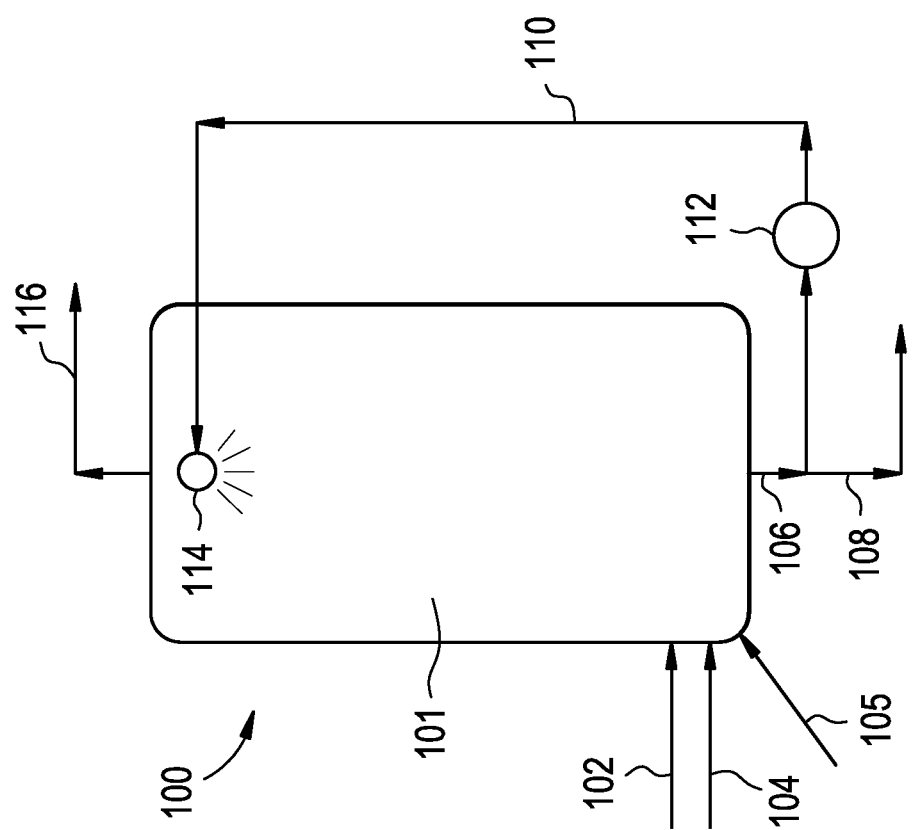
FIG. 1 illustrates an absorption element according to an embodiment of the present invention.

Referring now to FIG. 1, an absorption element 100 is shown. The absorption element is, for example, a gas and/or liquid contact device, such as a scrubber. The absorption element 100 defines a chamber 101. The chamber 101 of the absorption element 100 is in fluid communication with an inlet 102 of pressurized $CO_2$ rich flue gas stream. The $CO_2$ rich flue gas stream that enters the chamber 101 of the absorber 100 via inlet 102 is pressurized from 2 bar to 50 bar. The absorption element 100 is configured so that $CO_2$ rich flue gas stream may be present in the chamber 101 of the absorption element from between 1 to 600 seconds.

$NO_2$ absorbing additives are added to chamber 101 of the absorption element 100 via inlet 104. $NO_2$ absorbing additives include, but are not limited to, sodium $NaSO_2$, $Na_2S_2O_3$, $C_6H_{12}N_2$, or any combination thereof. The $NO_2$ absorbing additives convert at least a portion of the $NO_2$ included in the pressurized flue gas stream into nitric acid in the chamber 101 of the absorption element 100. Reduction of $NO_x$ is maximized by using multiple absorption agents. It has been discovered that the highest recovery of $NO_2$ will occur when $NaSO_2$, $Na_2S_2O_3$, $C_6H_{12}N_2$ are used together.

One or more pH adjustment agents, e.g., basic agents and which can minimize, $CO_2$ absorption, are added to the chamber 101 of the absorption element 100 via a third inlet 105. The pH adjustment agents may include, but are not limited to, NaOH. The pH adjustment agents are provided to maintain the pH below 9 to minimize $CO_2$ absorption. The $CO_2$ rich flue gas passes through the chamber 101 of the absorption element 100 and exits as a $NO_2$ reduced flue gas stream via outlet 116. The $NO_2$ reduced flue gas stream may then be transmitted to a next section of a gas processing unit, or to some other system.

Scrubber liquid formed of the $NO_2$ absorbing additive and the pH adjustment agent is collected at a bottom of the chamber 101 of the absorption element 100 and exits via outlet 106 for return to the absorption element via pump 112 and conduit 110. Scrubber liquid returned via conduit 110 is re-distributed into the absorption element 100 via liquid distributor 114. In one embodiment, the absorption element 100 is further configured with an outlet 108 which releases excess scrubber liquid and/or collect waste.

Figure 2:
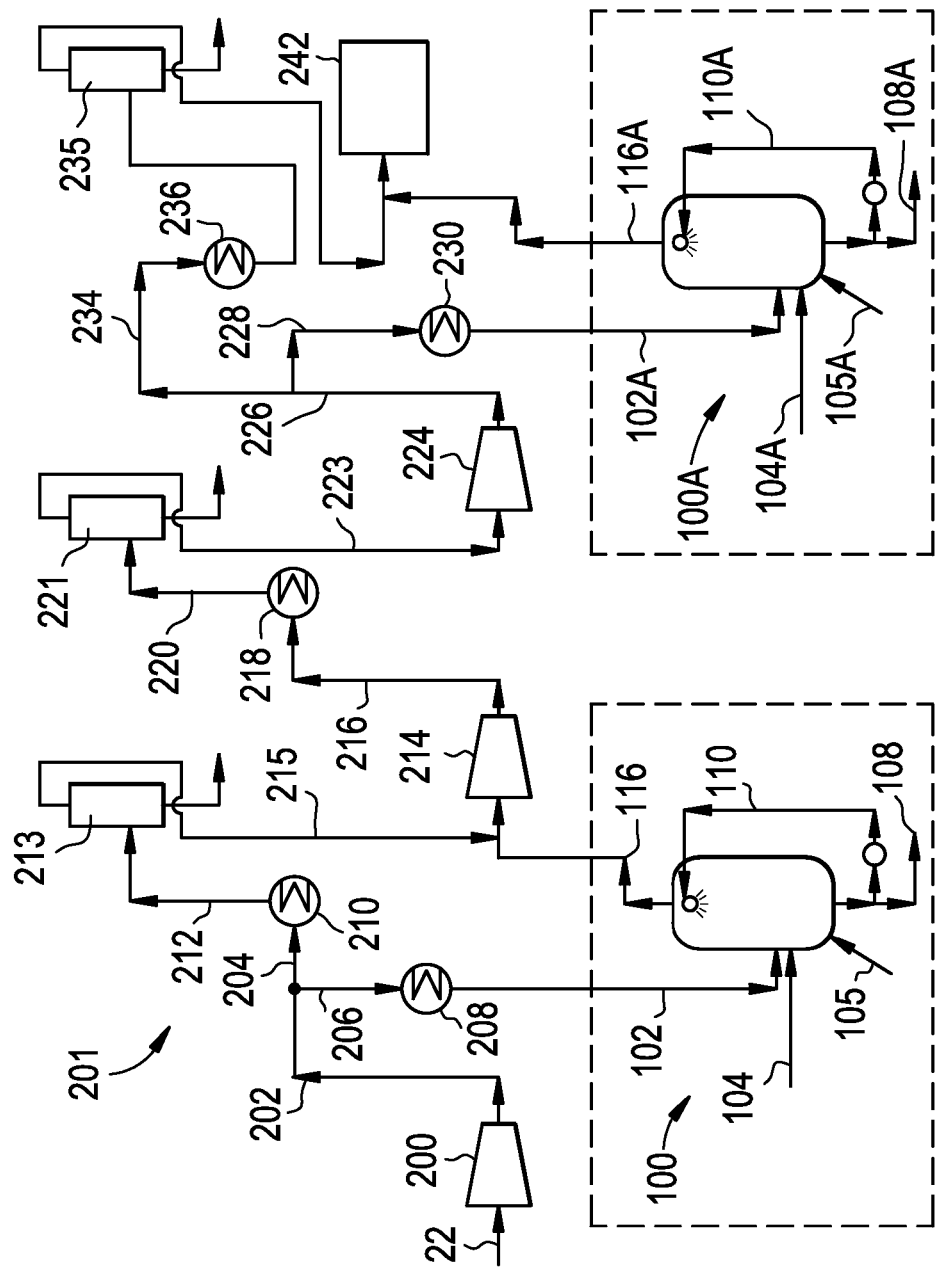
FIG. 2 illustrates a system for removing $NO_x$ from a flue gas stream, according to an embodiment of the present invention.

In reference to FIG. 2, a gas processing unit 201 employing multiple absorption elements 100, 100A is shown. A $CO_2$ rich flue gas enters the system 201 via conduit 22 which is in fluid communication with and downstream of an oxy-firing fuel reactor (not shown) or other system, e.g., a combustion system that provides flue gas having $CO_2$. The $CO_2$ rich flue gas entering the system 201 via conduit 22 may have undergone certain treatments including, but not limited to, a dust and particulate removal treatment, a desulfurization treatment, and/or a cooling treatment, and so forth. The $CO_2$ rich flue gas enters a first compressor 200 of the gas processing unit 201. The $CO_2$ rich flue gas stream entering the compressor 200 is pressurized to at least 2 bar, and is, for example, between 10 bar and 20 bar.

The compressor 200 is in fluid communication with a heat exchanger 208 via conduits 202, 206. The heat exchanger 208 is in fluid communication with a first absorption element 100 via conduit 102. Flue gas flows through the conduits 202, 206 from the compressor 200, through the heat exchanger 208 where the gas is cooled, and then through the conduit 102 and into the first absorption element 100.

Alternatively, a portion of the pressurized $CO_2$ rich flue gas stream exiting the compressor 200 via conduit 202 flows through conduit 204 to a second heat exchanger 210 to cool the gas. The second heat exchanger 210 is in fluid communication with a water knock-out vessel 213 via conduit 212. This water knock-out vessel 213 is configured to remove water and/or dehumidify by, e.g., gravity, condensation, precipitation and so forth, the $CO_2$ rich flue gas. The water knock-out vessel 213 is further in fluid communication with a second compressor 214 via conduit 215.

A portion of the $CO_2$ rich flue gas enters the absorption element 100 via conduit 102 and is treated therein to remove $NO_2$ from the gas stream. The absorption elements 100, 100A included in FIG. 2 are similar to the absorption element shown in FIG. 1 and include an inlet 104, 104A for providing an absorbing agent, an inlet 105, 105A, for providing a pH adjustment agent, a flue gas outlet 116, 116A, an excess scrubber liquid outlet 108, 108A, and a return conduit 110, 110A.

$NO_2$ reduced flue gas exits the first absorption element 100 via conduit 116, which is in fluid communication with conduit 215, and flows down stream to the second compressor 214. Although the embodiment shown in FIG. 2 shows a portion of the flue gas stream being directed to the first absorption element 100 via conduits 206, 102 and a portion of the flue gas stream bypassing the first absorption element 100 via conduit 204, 215 and being directed to the second compressor 214, the present disclosure is not limited in this regard. For example, all of the flue gas may be directed to the first absorption element 100 with use of flow control devices, e.g., dampers and valves, and thus cooling stage 210 may not need to be employed.

The second compressor 214 is in fluid communication with a heat exchanger 218 via conduit 216. The heat exchanger 218 is in fluid communication with a second water knock-out vessel 221 via conduit 220. The second water knock-out vessel is in fluid communication with a third compressor 224 via conduit 223. The flue gas stream is pressurized in the second compressor 214 and flows to the heat exchanger 218 via conduit 216. The flue gas stream subsequently flows through conduit 220 to the second water knock-out vessel 221, through the conduit 223 and to the third compressor 224.

The third compressor 224 increases pressure of $CO_2$ rich flue gas stream, for example, to a pressure of up to 50 bar, typically 25 to 35 bar, resulting in a highly pressurized $CO_2$ rich flue gas stream. The pressurized $CO_2$ rich flues gas stream exits the third compressor 224 via conduit 226. At least a portion of the pressurized flue gas stream is directed to a heat exchanger 230 via conduit 228 where the gas is cooled. The pressurized flue gas stream is subsequently transported to a second absorption element 100A. The second absorption element operates similar to the first absorption element 100 described above.

After absorption of $NO_2$ in second absorption element 100A, $NO_2$ reduced flue gas is directed to a $CO_2$ gas purification unit 242 via conduit 116A. A portion of the pressurized flue gas stream exiting the third compressor 224 may bypass the second absorption element 100A. That portion of the pressurized gas stream exits the third compressor 224 via conduit 226 and flows through conduit 234 to a heat exchanger 236. The heat exchanger 236 is in fluid communication a water knock-out vessel 235, which is further in fluid communication with the $CO_2$ gas purification unit 242.

Multiple alternative embodiments are contemplated by the present disclosure. For example, the present disclosure may be configured such that only the first absorption element 100 is incorporated or only second absorption element 100A is incorporated. If first absorption element 100 is included, it may be configured to receive all or only a portion of the pressurized flue gas stream from conduit 202. If second absorption element 100A is included, it may be configured to receive all or only a portion of the pressurized flue gas stream from the conduit 226. An additional absorption element may be added between, for example, the second compressor 214 and the third compressor 224, as well as, e.g., before the compressor 200. One or more absorption elements may be employed and may be configured to receive flue gas at any desired point of the gas processing unit 201. Multiple variations may be further employed. Absorbing additives may be used in various combinations and combinations thereof may be different between first absorption element 100 and second absorption element 100A.

The integration of $NO_x$ capture within the compression sections of a gas processing unit typical of an oxy-firing combustion system, provides a shift of $NO_x$ concentration to a higher concentration of $NO_2$ and minimizes the amount of NO in a $CO_2$ rich flue gas stream. By using the pressures inherent in a gas processing system, a shift of the $NO_x$ concentration to that favoring $NO_2$ may be accomplished without incorporating additional energy expenditures. Moreover, using the inherently high pressures of a gas processing unit such that pressurized $CO_2$ rich flue gas stream that enters one or more absorption elements enables for highly effective use of $NO_2$ absorbing additives to reduce $NO_x$.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for reducing $NO_x$ in a flue gas, comprising:
   an absorption element defining a chamber, wherein the absorption element comprises a gas/liquid scrubber;
   a first inlet in fluid communication with the chamber, the first inlet configured to deliver a pressurized flue gas to the chamber;
   an absorbing additive disposed in the chamber;
   a second inlet in fluid communication with the chamber, the second inlet configured to deliver the absorbing additive to the chamber; and
   an outlet in fluid communication with the chamber, the outlet configured to exhaust from the chamber flue gas that has contacted the absorbing additive; and
   a third inlet in fluid communication with the chamber, the third inlet configured to deliver a pH adjustment agent to the chamber; and
   a pH agent disposed in the chamber.

2. The system of claim 1, wherein a pressure of the flue gas delivered to the chamber is between 2 bar and 50 bar.

3. The system of claim 2, wherein the pressure is between 10 bar and 20 bar.

4. The system of claim 3, wherein the absorbing additive comprises at least one of $NaSO_2$, $Na_2S_2O_3$, and $C_6H_{12}N_2$.

5. The system of claim 4, wherein the pH agent comprises a basic agent.

6. The system of claim 4, wherein the absorption element is configured so that the absorbing additive, the pH adjustment agent, and the flue gas react in the chamber to remove $NO_2$ from the flue gas.

7. The system of claim 6, wherein the pH agent comprises NaOH.

8. The system of claim 2, wherein the absorbing additive is a $NO_2$ absorbing additive.

9. A method for reducing $NO_x$ in a flue gas stream, comprising:
- providing a pressurized flue gas at a pressure of 2 bars to 50 bars in a chamber of an absorption element, wherein the absorption element comprises a gas/liquid scrubber;
- providing an absorbing additive in the chamber so that the absorbing additive contacts at least a portion of the flue gas;
- exhausting at least a portion of the $CO_2$ flue gas from the chamber;
- providing a pH adjustment agent in the chamber.

10. The method of claim 9, wherein the pressure is between 10 bar and 20 bar.

11. The method of claim 10, wherein the absorbing additive comprises at least one of $NaSO_2$, $Na_2S_2O_3$, and $C_6H_{12}N_2$.

12. The method of claim 11, wherein the absorbing additive comprises $NaSO_2$, $Na_2S_2O_3$, and $C_6H_{12}N_2$.

13. The method of claim 11, wherein the absorbing additive, the pH adjustment agent, and the flue gas react in the chamber to remove $NO_2$ from the flue gas.

* * * * *